Aug. 10, 1943.    E. ERNST    2,326,449
FLAT OFFSET GAUGE
Filed Dec. 29, 1942
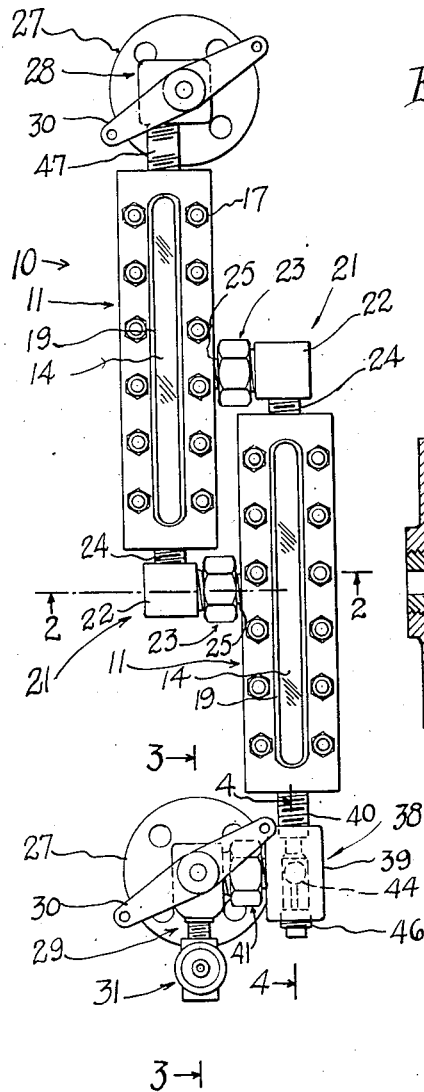
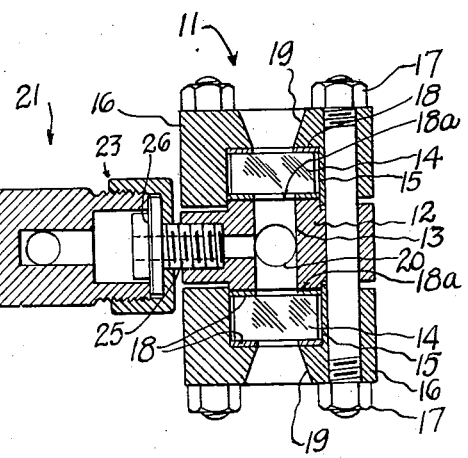
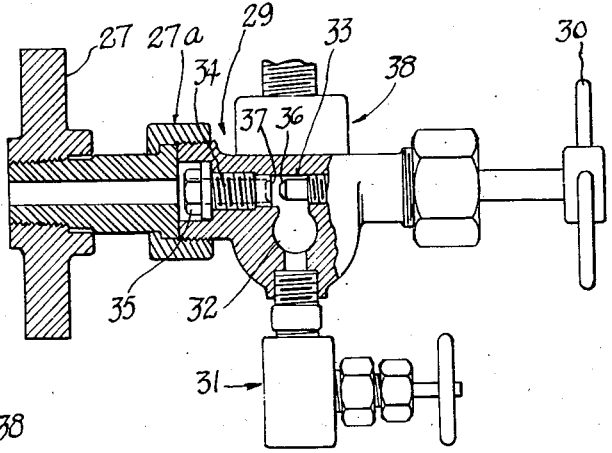
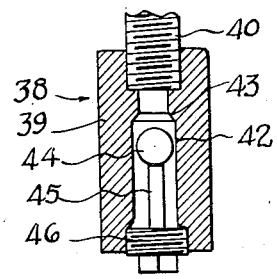
INVENTOR.
Eugene Ernst
BY Louis Shumacher
Atty.

Patented Aug. 10, 1943

2,326,449

UNITED STATES PATENT OFFICE 2,326,449

FLAT OFFSET GAUGE

Eugene Ernst, Livingston, N. J.

Application December 29, 1942, Serial No. 470,521

1 Claim. (Cl. 73—329)

This invention relates to water level gauges of the so-called flat type and has particular reference to offset gauges of that kind.

Gauges of the type referred to are used at extremely high boiler pressures which necessitate the employment of flat glasses powerfully clamped between cooperating plates to provide chambers in which the liquid level can be observed through windows in certain of the plates. Due to the occurrence of warping by heat and because the massiveness of the gauge structure, the same has been split into gauge portions which had to overlap to afford a continuous observation of the water level, such devices being designated as offset gauges. But owing to the excellence of the steel required and the large amount of precision machinery that was essential, the flat gauges remained very expensive not only to manufacture but also to repair or replace. For example, a popular offset flat gauge employs a single chamber plate for both gauge portions, so that if warping occurs at one gauge portion so as to cause leakage, the entire central or chambered section of the offset gauge must be discarded.

It is therefore one object of the invention to provide improved means to overcome the above mentioned difficulties, and, in particular, to provide gauge portions in the form of identical, interchangeable units connected together in a novel manner.

It is another object of the invention to provide such interchangeable gauge units whereby the machining and other operations of manufacture and assembling are identical to reduce cost and to permit the gauge units to be carried in stock for use or sale as individual units, for instance, as 10 inch gauges, or for use in pairs as offset 18 inch gauges, and to facilitate repair and replacement by permitting replacement of one defective gauge unit of an offset gauge, without discarding the other unit, whereby substantial labor and expense are saved.

Another object of the invention is to provide improved means for detachably interconnecting a pair of said gauge units to form an offset gauge in proper circulatory relation to the boiler, and in a cheap and highly compact manner, which does not require more than a reasonable degree of alignment or parallelism of the gauges so that any distortions may be allowed for.

A troublesome factor in water level gauges is the erosion and soiling of the glass, and while the former may be overcome by the use of mica sheets on the inner faces of the flat glasses, the latter remains so that periodic cleaning is required by blowing down the gauge in order to clean the glasses and restore clear visibility of the water level. While such soiling is less serious in the absence of erosion, it is an important factor so that it is a standard requirement to make provision for the blowing down of water level gauges. It is common knowledge that the soiling occurs mainly at the meniscus of the water, in the region within which the water level fluctuates in the boiler. Since the water level is generally near normal, the soiling becomes concentrated at the middle part of the gauge. Yet when the gauge is blown down, all parts are scoured equally by the steam and water.

It is therefore another object of the invention to provide an offset, flat type of water gauge having improved means whereby the force of blowing down the gauge is concentrated to a much higher degree at the normal regions of soiling than at other parts.

Another object of the invention is the provision of such a gauge wherein dirt on the gauge glass can be removed with much greater turbulence and much less blowing down than heretofore, so that erosion of the glass or dislocation or breakage of the protecting mica is reduced.

Other objects of the invention are to provide a gauge having improved valve control means including automatic valves; and improved means whereby the gauge is easily manufactured, assembled, mounted, and illuminated, and is fool proof and is durable, reliable and highly efficient in use.

The present invention is an improvement over that of my application Serial No. 457,993 for Knockdown flat offset gauges filed September 11, 1942.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated on the annexed drawing, wherein like parts are designated by the same reference characters throughout the several views.

In the drawing:

Figure 1 is a view in front elevation showing a device embodying the invention.

Fig. 2 is a sectional view taken on the broken line 2—2 of Fig. 1.

Fig. 3 is a sectional view taken on line 3—3 of Fig. 1.

Fig. 4 is a sectional view taken on line 4—4 of Fig. 1.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a plurality of identical flat gauge units 11. Each of these may have a central plate 12 having a closed ended central chamber forming slot 13 closed by the opposed flat glasses 14. The latter are preferably partially disposed in recesses 15 of the clamp plates 16 which are secured together by the bolts 17 to thus powerfully clamp the glass plates. Preferably gaskets 18 are disposed on opposite faces of each glass, and an erosion resisting mica sheet 18a (shown by heavy black line) is placed over each gasket at the inner face of each glass plate. Visibility clear through the water chamber 13 is obtained by the registering windows 19. For connecting the chamber to the boiler, upper and lower axial openings 20 are formed in the plate 12 for suitable pipe connections. The structure above described is conventional By the present invention, the gauge units 11 are identical and hence interchangeable, and each is completely separate of the other except for the pipe or tubular connections used. More particularly any warping of the center plate 12 of one gauge unit will not affect the other and thus cause leakage of both units. The gauge units 11 are interconnected in circulatory relation to each other so as to afford a true level indication. These connections may be afforded by identical structures 21, each comprising a head 22 having a union fitting 23 and end nipples 24, 25, with the latter being screw threaded into the adjacent center plates 12 of the gauge units for direct communication with the chambers 13. Each structure 21 forms an angle connection, the nipples 24 being aligned with their chambers 13 and the nipples 25 being transverse to their chambers 13. The nipples 24, 25 may be integral with the head and union fittings respectively and are as short as possible so that the gauge units will be closely side by side, and for other reasons that will now be described.

It is desirable that the transverse connections afforded by the nipples 25 shall lie as closely as possible to the normal region in which the water lever fluctuates due to ordinary changes in the water level of the boiler. Accordingly the nipples 24 are made as short as possible, and the union fittings 23 are horizontal with the nipples 25 lying approximately at the middle portions of the gauge units remotely from the upper and lower ends of the gauge 10. As a result, the full force of water and steam is available with maximum turbulence directly in the gauge chambers at the region at which the most soiling of the glasses 14 of the mica sheets 18a occurs. It will be understood that the maximum eddying and swirling occurs where the passages 13 and 25 intersect each other. In the upper gauge unit, the powerful turbulence created is carried down past the nipple 25, so as to almost instantly effectively clean the entire lower section of the gauge unit. In the lower gauge unit, swirling and eddying flow which greatly increases the turbulence of the blow down acts mainly upward, because some suction is created on the upper angle connection 21, due to the high velocity downward flow in the upper gauge unit. From the lower angle connection 21 the flow is principally downward and out of the lower gauge unit, but the main turbulence is carried upward to the region having lesser resistance by reason of the suction. Some circulation may occur in a counter clockwise direction, with the units 21 forming part of the circuit, but the essential thing is the turbulence caused by the interruptions due to the transverse nipple passages 25, so that any dirt is subjected to strains in many different directions whereby it is instantly torn loose and dislodged or worn away until none is left.

It is thus seen that the angle connections 21 afford the double purpose of easily connecting together interchangeable gauge units 11 and of locating transverse passages for positive and instantaneous blow down cleaning at the regions at which the water level normally fluctuates, namely in the lower part of the upper gauge unit and in the upper part of the lower gauge unit. Moreover, the angle connections are so located as to leave the upper and lower ends of the gauge 10 unobstructed for easy accessibility, inspection, and repair of parts, and for convenient mounting of lighting means for the gauge units. Moreover, if any warping occurs, the connections 21 are too close together to be themselves subjected to warping and consequent leakage. In fact, if necessary, one of the union fittings 23 may be shimmed up as at 26 for adjustment and alignment of parts in a leak proof manner. If any gauge unit 11 is warped or otherwise defective it may be quickly removed and replaced by opening the union fittings 23.

The gauge 10 may be connected to the water column of a boiler as by flanges 27 to which the cut off valves 28, 29 are connected by union joints 27a. These valves may have levers 30 to which continuous chains (not shown) may be connected for opening and closing the cut off valves. The latter are closed when the gauge must be repaired. The bottom valve 29 may be equipped with a drain cock or valve 31 whereby the gauge may be blown down with the valve 29 closed. This is possible because the drain valve communicates at 32 with the valve chamber 33 back of the tubular valve insert 34. It will be noted that the latter is threaded and is formed with a headed end 35 for easy removal and replacement upon opening the union joint 27a. When the valve 29 is closed, the valve element 36 engages the valve seat 37 of the insert 34, without interfering with flow through the drain valve 31 which may then be opened. The valve 28 may be of like construction except that the drain valve 31 is omitted. The particular advantage in the described arrangement of the valves 29, 31 is that a valve device 38 may be provided between the bottom of the gauge and the valves 29, 31 adapted to automatically close in response to an upward dynamic force of liquid. The valve device 38 may include a body 39 connected to the lower gauge unit by a nipple 40 threaded into a passage 20, and connected to the valve 29 by a union joint 41. In this body is formed a passage 42 coaxial with the nipple 40 and having a downward facing central seat 43 for a ball valve 44 retained in operative relation to the seat by a pin 45 carried by a closure plug 46 for the passage 42. It will be apparent that it is much more advantageous to place the drain valve 31 on the cut off valve 29 where it is spaced from the automatic valve device 38 and will not interfere with the operation of the latter, nor with inspection or replacement of the ball valve 44.

In operation, the ball valve 44 rests in normally open position on the axial pin 45 so that circulation can occur between the gauge 10 and the boiler to permit a proper indication of water level. If a glass plate 14 should accidentally break, a condition which rarely occurs, the ball 44 will be driven upward to engage its seat 43 to close the outlet from the valve 29. The flow of water will thus be prevented automatically, and the operator may then quickly close the valves 28, 29 to shut off the leakage of steam. When the drain valve 31 is opened to blow down the gauge, the ball 44 will not be affected. When repair of the gauge is necessary, the valves 28, 29 are closed, whereupon the unions 23 and 41 may be opened for removal and replacement of the lower gauge unit 11; but if replacement of the upper gauge unit is desired, it may be unscrewed at the nipple 47 which connects the same to the valve 28.

The gauge units 11 are of sufficient length so that one of them may function as a gauge which may be 10 inches in length. In order to align the top and bottom connections for such a single unit gauge, with the use of the attachments shown in Fig. 1, it is merely necessary to employ the valves 29 and 28 at top and bottom, but omitting the ball valve 44 in the top body 39 since the latter would be inverted and the ball valve would be in normally closed position. Since the gauge connections or structure would be identical at the top and bottom, the vertical connection nipples such as 40 and 47 would be in alignment, and long nipples need merely be substituted for the latter.

To blow down the gauge 10, the top valve 28 remains open, the bottom valve 29 is preferably closed, and the drain valve 31 is opened. The flow is downward directly through the gauge chambers of the upper and lower units, and hence most effective against soiling that impairs the visibility of the meniscus. Some swirling of course occurs in any flow, but its effectiveness is reduced by back pressure caused by friction in the gauge and its connections. In this invention the interrupting transverse passages 25 assure a great increase in turbulence as may be observed through the glasses 14, and this is done closely to the normal region of rise and fall of water level, before the energy is expended. This vital region is from about the mid portion of the upper gauge unit downward and from about the mid portion of the lower gauge unit upward, and permits almost instantaneous cleaning of the gauge. Scouring of the glass plates or breakage of the thin, brittle, expensive mica sheets is largely avoided.

I claim:

A water level gauge having a plurality of flat gauge units in offset, vertically overlapping relation to each other, said gauge units being identical and interchangeable, and identical means interconnecting the gauge units in circulatory relation to each other, one interconnecting means being connected to the top of the lower gauge unit and to a mid portion of the upper gauge unit, the other interconnecting means being connected to the bottom of the upper gauge unit and to a mid portion of the lower gauge unit so that both interconnecting means are spaced remotely from the upper and lower ends of the gauge.

EUGENE ERNST.